(12) United States Patent
Naik et al.

(10) Patent No.: US 7,289,889 B2
(45) Date of Patent: Oct. 30, 2007

(54) VEHICLE CONTROL SYSTEM AND METHOD

(75) Inventors: Sanjeev M. Naik, Troy, MI (US); Pradyumna K. Mishra, Royal Oak, MI (US); Mark N. Howell, Rochester Hills, MI (US); Rami I. Debouk, Dearborn, MI (US); Mutasim A. Salman, Rochester Hills, MI (US)

(73) Assignee: General Motors Corporation, Detroit, MI (US)

( * ) Notice: Subject to any disclaimer, the term of this patent is extended or adjusted under 35 U.S.C. 154(b) by 590 days.

(21) Appl. No.: 10/823,170

(22) Filed: Apr. 13, 2004

(65) Prior Publication Data

US 2005/0228546 A1 Oct. 13, 2005

(51) Int. Cl.
*G06F 17/00* (2006.01)
(52) U.S. Cl. .............................. 701/1; 701/36
(58) Field of Classification Search ................ 702/108, 702/127; 714/735–736; 701/1, 29, 34, 36
See application file for complete search history.

(56) References Cited

U.S. PATENT DOCUMENTS

| | | | |
|---|---|---|---|
| 5,339,404 A | | 8/1994 | Vandling |
| 5,404,304 A | * | 4/1995 | Wise et al. ............. 700/304 |
| 5,406,485 A | * | 4/1995 | Wise et al. ............. 701/29 |
| 5,459,732 A | * | 10/1995 | Wise et al. ............. 701/76 |
| 5,694,542 A | | 12/1997 | Kopetz |
| 6,240,526 B1 | | 5/2001 | Petivan et al. |
| 6,449,732 B1 | | 9/2002 | Rasmussen et al. |
| 2005/0225165 A1 | * | 10/2005 | Naik et al. ............. 303/20 |

* cited by examiner

*Primary Examiner*—Yonel Beaulieu (57) ABSTRACT

A control system and method for use in vehicles, such as automotive vehicles. The control system and method is particularly adapted for use in vehicles having by-wire control systems. The control system uses three system controllers. Each of the controllers is adapted to receive redundant control inputs from at least one input device, such as a steering actuator, an accelerator actuator and a brake actuator. Each controller is adapted to receive a different unprocessed actuator sensor signal and a processed actuator sensor signal which are associated with the input device. Each controller may also be adapted to receive a sensor status signal which is also associated with the input device. In accordance with the method of the invention, these signals may be used to determine a sensor signal which may be used as the basis for control of control systems or components in response to the input device. Depending on the status of these signals, the sensor signal used for control may comprise the processed sensor signal or a resolved sensor signal. The sensor signal used for control may be determined by implementing a voting process in conjunction with the controllers which utilizes both the unprocessed sensor signals and the processed sensor signals.

26 Claims, 8 Drawing Sheets

VEHICLE CONTROL SYSTEM AND METHOD

TECHNICAL FIELD

This invention generally comprises a vehicle control system. More particularly, this invention comprises a fault tolerant by-wire vehicle control system.

BACKGROUND OF THE INVENTION

By wire vehicle control systems provide a number of advantages with regard to system packaging. The associated electronic control systems and the implementation of advanced computer control algorithms facilitate a number of new control features. However, such systems also typically remove any direct mechanical or hydraulic force transmitting path between the vehicle operator and the controller. Therefore, much attention has been given to designing by wire vehicle control systems and control architectures that ensure their operability in response to an event (e.g., any event which negatively impacts or affects control signals, data, hardware, software or other elements associated with the operation of such systems) occurring in the control path between the control command initiated by the operator and the associated controller. One general technique which has been employed in such systems is redundancy, to provide fault tolerance to such events. One design approach to provide fault tolerance which has been utilized in by wire vehicle control systems has been to design control systems and control architectures which ensure that no single point event in the portion of the system associated with the operator control commands will cause an inability to determine the intended control command.

Figure 1:
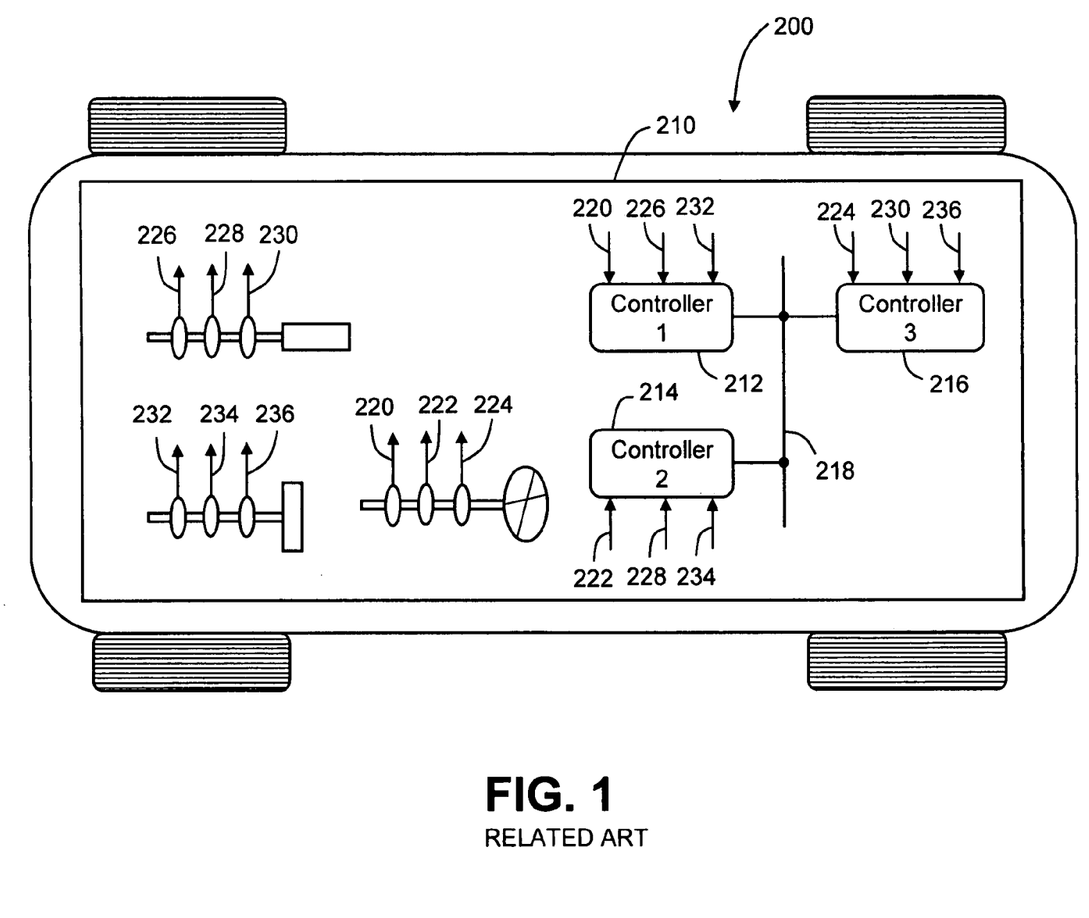
FIG. 1 is a schematic illustration of a first related art control system.

FIG. 1 schematically illustrates a vehicle 200 having a related art vehicle control system 210. A configuration such as illustrated for vehicle control system 210 would be applicable to a vehicle having a plurality of by-wire control systems, such as by-wire steering control, accelerator control and braking control systems. Vehicle control system 210 comprises three vehicle or system controllers to provide the desired redundancy associated with the control of vehicle, a first controller 212, a second controller 214 and a third controller 216. These controllers are each operatively connected to a controller bus 218 and are each in signal communication with one another, such that any information or input received by one of the controllers may be shared with any or all of the other controllers. Controllers 212,214, 216 are adapted to receive a plurality of unprocessed or raw sensor signals associated with a corresponding plurality of respective sensors and signal lines, including steering actuator sensor signals 220,222,224, accelerator actuator sensor signals 226,228,230 and brake actuator sensor signals 232, 234,236. Each of the controllers receive the redundant sensor signals and utilize known voting techniques to assure that a representative steering, accelerator and braking control signal or command will be available even in the event of a single point event related to a sensor, signal line or a controller. However, this control architecture does not provide significant redundancy or fault tolerance with respect to a single point event related to controller bus 218 because such an event may make it impossible for controllers 212, 214,216 to vote to determine the representative steering, accelerator and braking sensor signal to be used for control of these systems.

Figure 2:
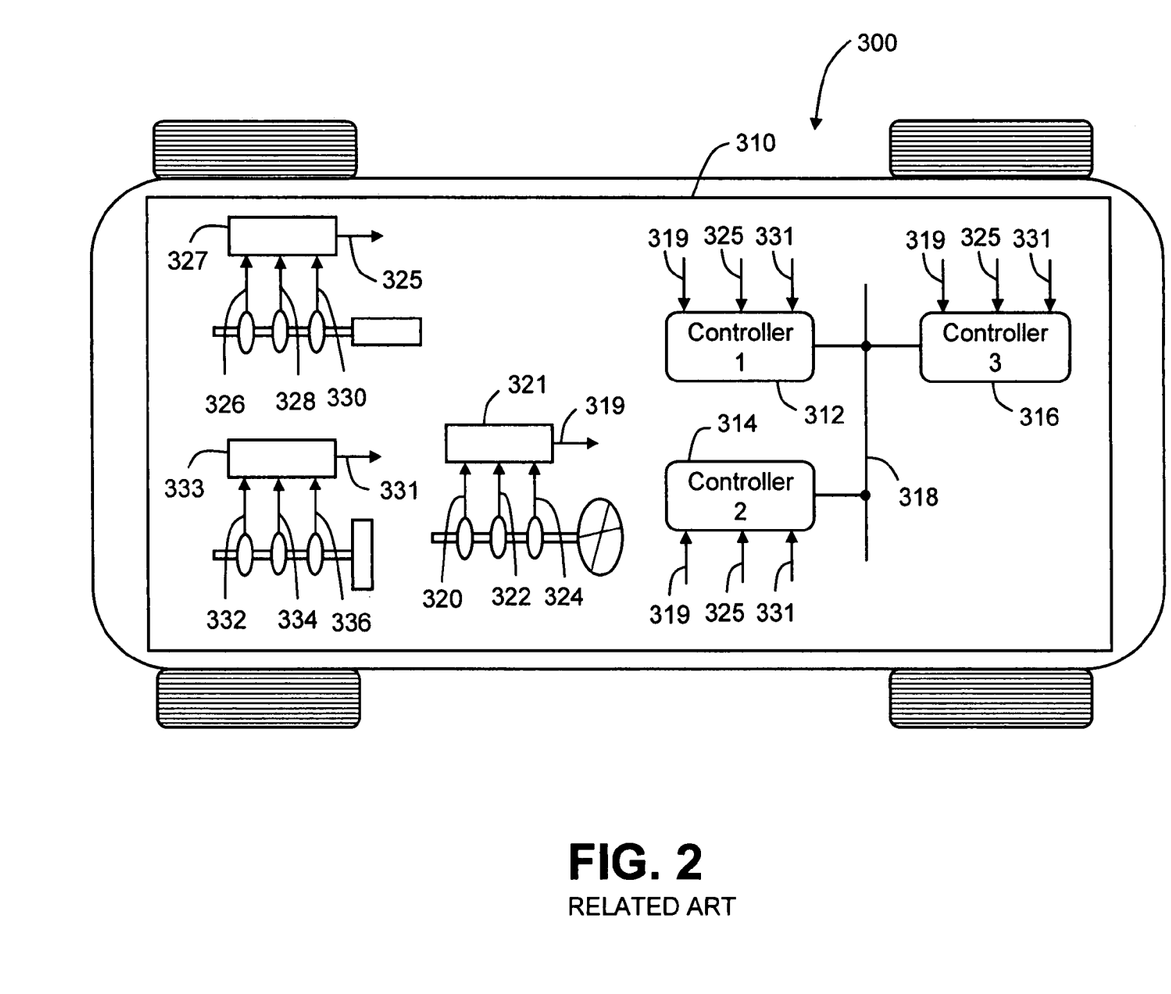
FIG. 2 is a schematic illustration of a second related art control system.

FIG. 2 schematically illustrates a vehicle 300 having a second related art vehicle control system 310. A configuration such as illustrated for vehicle control system 310 would also be applicable to a vehicle having a plurality of by-wire control systems, such as by-wire steering control, accelerator control and braking control systems. Vehicle control system 310 comprises three vehicle or system controllers to provide the desired redundancy associated with the control of vehicle, a first controller 312, a second controller 314 and a third controller 316. These controllers are each operatively connected to a controller bus 318 and are each in signal communication with one another, such that any information or input received by one of the controllers may be shared with any or all of the other controllers. Controllers 312,314, 316 are each adapted to receive a processed steering sensor signal 319, which is determined using a steering actuator sensor module 321 from a plurality of unprocessed steering actuator sensor signals 320,322,324 from a corresponding number of redundant steering actuator sensors, a processed accelerator sensor signal 325, which is determined using an accelerator actuator sensor module 327 from a plurality of unprocessed accelerator actuator sensor signals 326,328,330 from a corresponding number of redundant accelerator actuator sensors, and a processed brake actuator sensor signal 331 which is determined using a brake actuator sensor module 333 from a plurality of unprocessed brake actuator sensors signals 332,334,336 from a corresponding number of redundant brake actuator sensors. The processed sensor signal of each of the controls is determined from the respective raw sensor signals in an associated signal processing module. The controllers receive the redundant processed sensor signals and may utilize known voting techniques to assure that a representative steering, accelerator and braking control signal or command will be available should a single point event occur related to a sensor, signal line or controller. However, this control architecture does not provide significant redundancy or fault tolerance with respect to a single point event related to one of the signal processing modules, because such an event may affect the processed sensor signal associated with the module in which the event occurs, thus making it impossible for controllers 312,314,316 to provide vehicle control associated with such signal. Also, if voting is utilized, this architecture does not provide significant redundancy or fault tolerance with respect to a single point event related to the controller bus, as described above.

Therefore, it is desirable to provide a control system and system architecture that provides enhanced redundancy and fault tolerance with respect to various single point events of the types described above.

SUMMARY OF THE INVENTION

The present invention comprises a by-wire vehicle control system and control architecture which provides system level redundancy and fault tolerance. The present invention particularly provides system level redundancy and fault tolerance with respect to certain sensor inputs which are used to develop the control signals used for vehicle control, such as steering actuator sensor inputs, accelerator actuator sensor inputs and braking actuator sensor inputs.

The control system of the present invention includes at least one input device which is operatively connected to a first sensor, a second sensor and a third sensor for sensing an input to said input device and providing in response thereto a first unprocessed sensor signal, a second unprocessed sensor signal and a third unprocessed sensor signal. The control system also includes an input device module which is adapted to receive the first unprocessed sensor signal, the second unprocessed sensor signal and the third unprocessed sensor signal and provide a processed sensor signal output. The control system also includes a first controller which is adapted to receive the first unprocessed sensor signal and the processed sensor signal; a second controller which is adapted to receive the second unprocessed sensor signal and the processed sensor signal; and a third controller which is adapted to receive the third unprocessed sensor signal and the processed sensor signal. The control system also includes a controller bus which is operatively connected to each of said first controller, said second controller and said third controller and adapted to provide signal communication between each of them. The control system also may be configured so that the input device module is also adapted to provide a sensor status signal output related to the status of the unprocessed sensor signals, and the first controller, second controller and third controller may each be adapted to receive the sensor status signal.

The control system is generally adapted to provide control using the processed sensor signals. However, the control system is adapted to use the unprocessed sensor signals to provide redundancy and fault tolerance with regard to the processed sensor signals. The invention also includes a method in which each of the controllers compares the processed sensor signal(s) and the unprocessed sensor signal (s) it has received to determine a signal differential. The signal differentials are compared against a predetermined differential threshold to identify potential faults associated with the processed or unprocessed sensor signals. If no fault is detected, the processed sensor signal is used by the controllers to provide control based on the sensed input. If a fault is identified, the controllers are adapted to vote to determine a resolved sensor signal. The resolved sensor signal may include an average or median value of the signals not associated with the fault, or may include a predetermined fault value if the voting is not able to determine a reliable value of the sensor signal for use in control. The sensor status signal may also be utilized to provide an additional measure of fault tolerance and reduce the need for voting between the controllers to determine the resolved sensor signal in the event of a fault.

The present invention is advantageous in that it provides improved fault tolerance and redundancy over related art systems which utilize unprocessed sensor signals and continuous voting through the controller bus to determine a control signal because it is believed to be less susceptible to events related to the controller bus, since voting over the controller bus is only required if a signal fault is detected. The present invention is also advantageous in that it provides improved fault tolerance and redundancy over prior art systems which utilize processed sensor signals because it is believed to be more fault tolerant with respect to events related to the control modules or loss of the processed signal to one or more of the controllers, since voting using the unprocessed sensor signals may be utilized to determine a resolved sensor signal in response to such events.

BRIEF DESCRIPTION OF THE DRAWINGS

The present invention will be more fully understood from the accompanying drawings, in which.

DESCRIPTION OF THE PREFERRED EMBODIMENT

Figure 3:
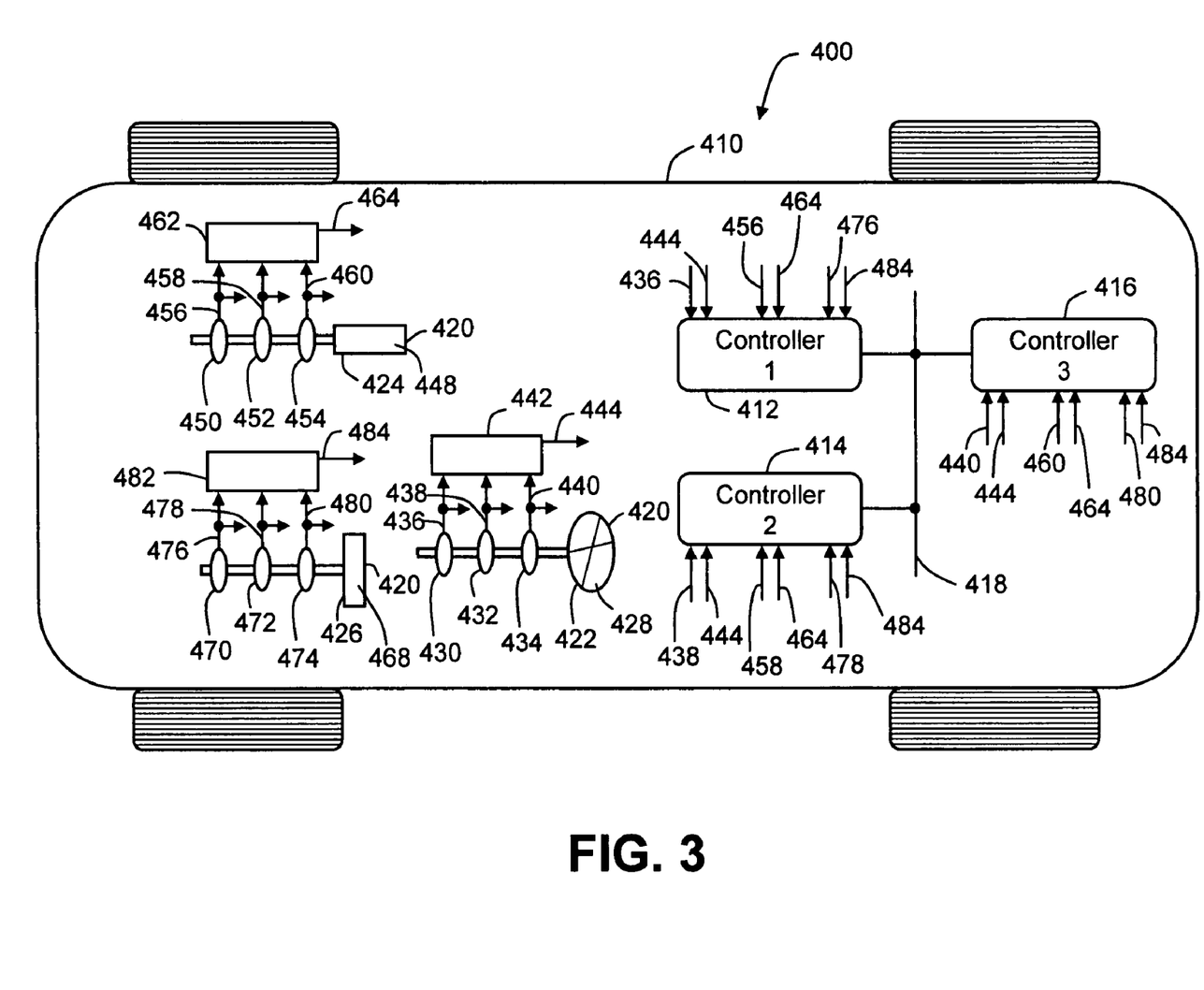
FIG. 3 is a schematic illustration of an embodiment of a control system of the present invention; and, FIG. 4 is a schematic illustration of a second embodiment of a control system of the present invention.

FIG. 3 schematically illustrates a vehicle 400 having vehicle control system 410. A configuration such as that illustrated for vehicle control system 410 would be applicable to a vehicle 400 having a plurality of by-wire control systems, such as by-wire steering control, accelerator control and braking control systems. Vehicle control system 410 comprises three vehicle or system controllers to provide the desired redundancy associated with the control of vehicle 400, and includes first controller 412, second controller 414 and third controller 416. Controllers 412,414,416 are each operatively connected to controller bus 418 and are each in signal communication with one another through controller bus 418, such that any information or input received by one of the controllers may be shared with any or all of the other controllers. Controllers 412,414,416 are each adapted to receive both unprocessed (raw) sensor signals as well as a processed sensor signal associated with at least one input device 420. These are preferably analog signals, but may also comprise digital signals. Control system 410 is generally adapted to provide control based on the processed sensor signal associated with at least one input device 420. The unprocessed sensor signals are generally utilized to provide signal redundancy with respect to the processed sensor signal and to provide fault tolerance of control system 410 with respect to events, as described herein, associated with processed sensor signal, which are referred to herein as an "event" or "fault". While at least one input device 420 is required in accordance with control system 410, it is believed that for most applications thereof, a plurality of input devices 420 is preferred. Referring to FIG. 3, a plurality of input devices 420 is illustrated including steering actuator 422, accelerator actuator 424, and brake actuator 426. While steering actuator 422, accelerator actuator 424, and brake actuator 426 constitute primary vehicle input devices, other input devices are also possible, such as all manner of vehicle control systems, subsystems or components, including vehicle stability enhancement (VSE) systems, yaw control systems, traction control systems, antilock braking systems (ABS), electronic throttle control systems, variable assist steering systems, variable ratio steering systems, active front steering (AFS) systems, variable suspension systems, which incorporate a variety of redundant sensors, including yaw rate sensors, lateral acceleration sensors and other sensors. It is believed that control system 410 of the present invention may also be adapted to implement certain features of the control system and method disclosed in related, commonly assigned, co-pending U.S. patent application Ser. No. 10/823,469 filed on even date herewith, which is hereby incorporated herein by reference in its entirety.

As used herein, the term operatively connected is intended broadly to comprise all of the connections, including mechanical, electrical, optical or other connections, necessary to enable the operation of one constituent element of control system 410 with another. The term signal communication is intended to encompass all forms of signals (e.g., analog and digital signals) and methods of communicating signals (e.g., all forms of wired and wireless communications) from one element of control system 410 to another.

Figure 4:
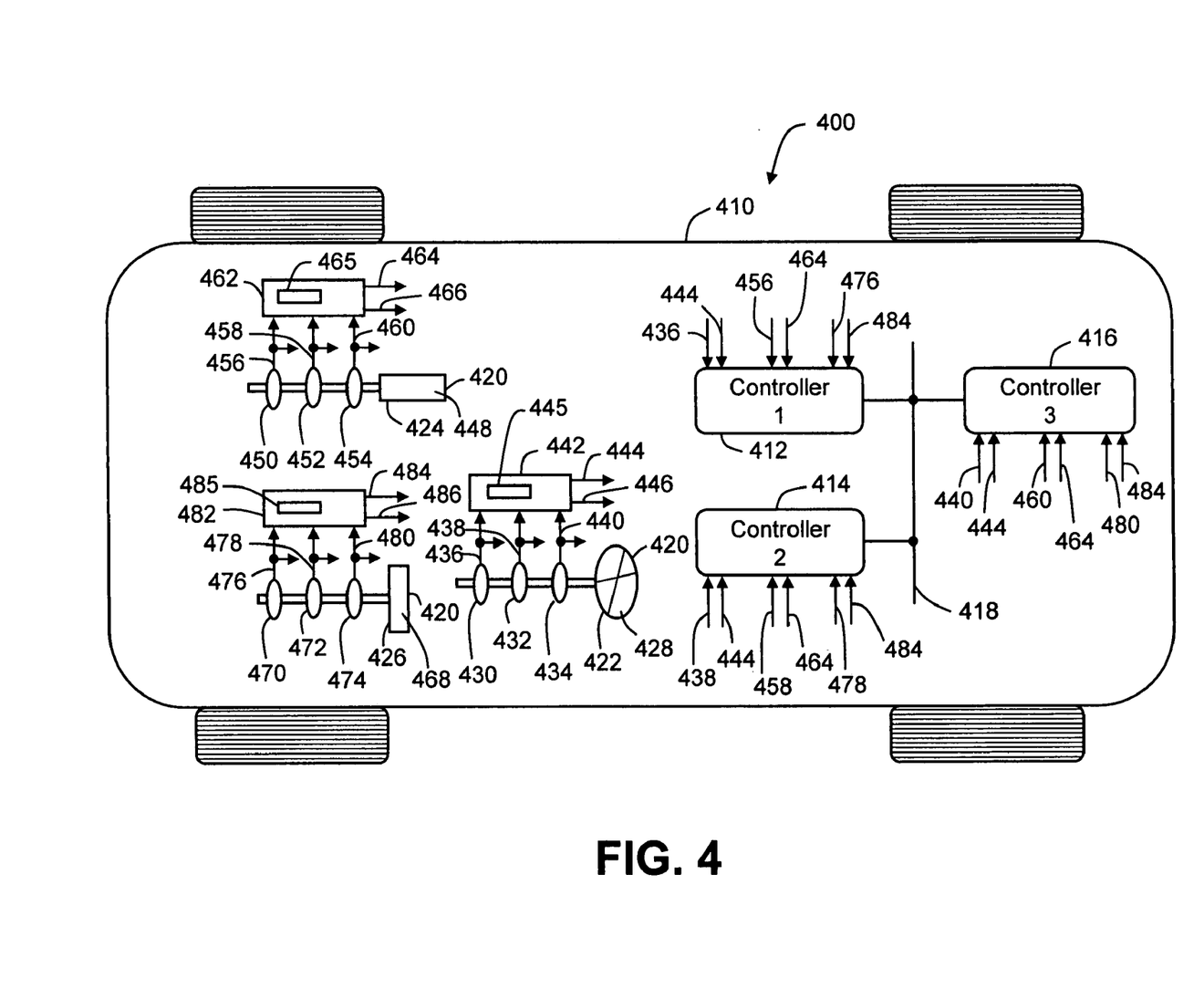

In the embodiment shown in FIG. 3, steering actuator 422 comprises a steering input device, such as steering wheel 428, however, any device suitable for providing a steering input may be utilized for steering actuator 422 (e.g. joystick, control stick, or other steering input device). Steering actuator 422 is operatively coupled to three steering actuator sensors, first steering actuator sensor 430, second steering actuator sensor 432 and third steering actuator sensor 434. Steering actuator sensors 430,432,434 are each adapted to provide a signal output in response to an input to steering actuator 422, such as an operator input. Steering actuator sensors 430,432,434 may be any type of sensor suitable for providing an output signal that is indicative of the steering input, such as sensors that are adapted to provide a signal which is indicative of a steering angle input as are well-known. Steering actuator sensors 430,432,434 are adapted to provide as an output respective unprocessed or raw steering actuator sensor signals, including first unprocessed steering actuator sensor signal 436, second unprocessed steering actuator sensor signal 438, and third unprocessed steering actuator sensor signal 440. Steering actuator sensor signals 436,438,440 are each preferably provided as an output using separate hardwired sensor signal lines (not shown) to both steering actuator module 442 as well as each of controllers 412,414,416, respectively. Steering actuator module 442 is adapted to receive steering actuator sensor signals 436,438, 440 and produce as an output processed steering actuator signal 444. Processed steering actuator signal 444 is preferably provided as an output using hardwired sensor signal lines (not shown) to each of controllers 412,414,416. As illustrated in FIG. 4, control system 410 may also optionally be adapted so that steering actuator module 442 is adapted to provide as an output steering actuator sensor status signal 446, which is based upon and representative of the value of a steering sensor fault status bit vector 445, and which may be determined from the values of unprocessed steering sensor signals 436,438,440, as described herein. This signal provides an indication of the fault/no-fault status of each of the steering actuator sensors and/or associated sensor signal lines (not shown). Steering actuator sensor status signal 446 is preferably provided as an output using hardwired data signal lines (not shown) to each of controllers 412,414,416. Steering actuator sensor status signal 446 is preferably a digital signal, but may also comprise an analog signal, and data signal lines are preferably conventional digital data signal lines.

Referring again to FIG. 3, accelerator actuator 424 comprises a accelerator input device, such as accelerator pedal 448, however, any device suitable for providing an accelerator input may be utilized for accelerator actuator 424 (e.g. joystick, control stick, pressure sensing steering wheel or other accelerator input device). Accelerator actuator 424 is operatively coupled to three accelerator actuator sensors, first accelerator actuator sensor 450, second accelerator actuator sensor 452 and third accelerator actuator sensor 454. Accelerator actuator sensors 450,452,454 are each adapted to provide a signal output in response to an input to accelerator actuator 424, such as an operator input. Accelerator actuator sensors 450,452,454 may be any type of sensor suitable for providing an output signal that is indicative of the accelerator input, such as sensors that are adapted to provide a signal which is indicative of an applied force or pressure as are well-known. Accelerator actuator sensors 450,452,454 are adapted to provide as an output respective unprocessed or raw accelerator actuator sensor signals, including first unprocessed accelerator actuator sensor signal 456, second unprocessed accelerator actuator sensor signal 458, and third unprocessed accelerator actuator sensor signal 460. Accelerator actuator sensor signals 456,458,460 are each preferably provided as an output using separate hardwired sensor signal lines (not shown) to both accelerator actuator module 462 as well as each of controllers 412,414, 416, respectively. Accelerator actuator module 462 is adapted to receive accelerator actuator sensor signals 456, 458,460 and produce as an output processed accelerator actuator signal 464. Processed accelerator actuator signal 464 is preferably provided as an output using hardwired sensor signal lines (not shown) to each of controllers 412, 414,416. As illustrated in FIG. 4, control system 410 may also optionally be adapted so that accelerator actuator module 462 is adapted to provide as an output accelerator actuator sensor status signal 466, which is based upon and representative of the value of a accelerator sensor fault status bit vector 465, and which may be determined from the values of unprocessed steering sensor signals 456,458,460, as described herein. This signal provides an indication of the fault/no-fault status of each of the accelerator actuator sensors and/or associated sensor signal lines (not shown). Accelerator actuator sensor status signal 466 is preferably provided as an output using hardwired data signal lines (not shown) to each of controllers 412,414,416. Accelerator actuator sensor status signal 466 is preferably a digital signal, but may also comprise an analog signal, and data signal lines are preferably conventional digital data signal lines.

Referring again to FIG. 3, brake actuator 426 comprises a brake input device, such as brake pedal 468, however, any device suitable for providing a brake input may be utilized for brake actuator 426 (e.g. joystick, control stick, pressure sensing steering wheel or other brake input device). Brake actuator 426 is operatively coupled to three brake actuator sensors, first brake actuator sensor 470, second brake actuator sensor 472 and third brake actuator sensor 474. Brake actuator sensors 470,472,474 are each adapted to provide a signal output in response to an input to brake actuator 426, such as an operator input. Brake actuator sensors 470,472, 474 may be any type of sensor suitable for providing an output signal that is indicative of the brake input, such as sensors that are adapted to provide a signal which is indicative of an applied force or pressure as are well-known. Brake actuator sensors 470,472,474 are adapted to provide as an output respective unprocessed or raw brake actuator sensor signals, including first unprocessed brake actuator sensor signal 476, second unprocessed brake actuator sensor signal 478, and third unprocessed brake actuator sensor signal 480. Brake actuator sensor signals 476,478,480 are each preferably provided as an output using separate hardwired sensor signal lines (not shown) to both brake actuator module 482 as well as each of controllers 412,414,416, respectively. Brake actuator module 482 is adapted to receive brake actuator sensor signals 476,478,480 and produce as an output processed brake actuator signal 484. Processed brake actuator signal 484 is preferably provided as an output using hardwired sensor signal lines (not shown) to each of controllers 412,414,416. As illustrated in FIG. 4, control system 410 may also optionally be adapted so that brake actuator module 482 is adapted to provide as an output brake actuator sensor status signal 486, which is based upon and representative of the value of a steering sensor fault status bit vector 485, and which may be determined from the values of unprocessed steering sensor signals 476,478,480, as described herein. This signal provides an indication of the fault/no-fault status of each of the brake actuator sensors and/or associated sensor signal lines (not shown). Brake actuator sensor status signal 486 is preferably provided as an output using hardwired data signal lines (not shown) to each of controllers 412,414,416. Brake actuator sensor status signal 486 is preferably a digital signal, but may also comprise an analog signal, and data signal lines are preferably conventional digital data signal lines.

Controllers 412,414,416 may be incorporated into a single controller as separate control modules or portions thereof. However, it is believed to be preferred to implement controllers 412,414,416 as shown in FIGS. 3 and 4 as separate and distinct controllers or control modules to provide additional protection against common mode events.

Control system 410 generally, and in particular controllers 412,414,416, comprise a real time distributed computing system having triple modular redundancy using three control units. Controllers 412,414,416 are preferably substantially identical in construction with respect to their associated control hardware and components; however, they may implement somewhat different control algorithms, for example, to provide a distinction between the devices which they are adapted to control. Each of them may also incorporate somewhat different hardware depending on the specific systems and components which they are adapted to control. Controllers 412,414,416 are of conventional construction and well known, such as the Motorola PowerPC series of controllers. This construction may, for example, comprise two basic control units, a communication control unit (CCU) and a computing unit (CU). The CCU may comprise a microcontroller having internal random-access memory (RAM) and an internal time-processing unit (TPU) that is well suited to perform the precise time measurements required by certain time-triggered communication protocols. The microcontroller may also comprise an internal data bus. The program of the microcontroller and the data structures that control the messages to be sent and received on controller bus 418 and other data communication buses or other communication signal lines (not shown) used to communicate with the control systems and components (not shown) are preferably contained in a form of read only memory (ROM). The messages are assembled and disassembled by an interface controller. The interface controller generates and receives the logical transmission signals from bus drivers that are connected to the buses, such as controller bus 418. The interface between the CCU and the CU is generally realized by a digital output line and a form of shared memory, such as Dual Ported Random Access Memory (DPRAM), which can be accessed from both the CCU and the CU. The digital output line supplies a globally synchronized time signal to the CU from the CCU. This unidirectional signal is generally the only control signal that passes the interface between the CCU and the CU. The shared memory contains the data structures that are sent from the host CU to the CCU and vice versa as well as control and status information. The hardware architecture of the CU may generally comprise a central processing unit (CPU), RAM and an input/output unit that is adapted to provide input/output signals to the various vehicle control systems, subsystems and components which control their function. The devices of the CU are also generally interconnected by an industry standard bus. This is an exemplary description of a controller architecture that is adapted for use in control system 410 and controllers 412,414,416. Controllers having other controller architectures are also possible for providing control of system 400 and use in controllers 412,414,416 in accordance with the description provided herein.

Controller bus 418 is a conventional data communication bus, having an associated communication protocol and communication interface, as is commonly used in vehicular applications. Controller bus 418, may, however, comprise any suitable bus medium and communication protocol, including various forms of wireless communication methods and protocols. Examples of suitable buses/communication protocols include the MOST (Media Oriented Systems Transport) bus, SAE J1850 bus, byteflight bus, TTP (Time Triggered Protocal) bus, FlexRay bus, IDB-1394 (Intelligent Transportation System Data Bus) bus, and the CAN (Controller Area Network) bus.

Each of steering actuator module 442, accelerator actuator module 462 and braking actuator module 482 is similarly adapted to receive as an input and process its respective unprocessed sensor signals, namely unprocessed steering sensor signals 436,438,440, unprocessed accelerator sensor signals 456,458,460 and unprocessed braking sensor signals 476,478,480. Each of steering actuator module 442, accelerator actuator module 462 and braking actuator module 482 is also similarly adapted to determine a processed sensor signal output, namely processed steering sensor signal 444, processed accelerator sensor signal 464 and processed braking sensor signal 484, which are each representative of respective steering, accelerator and braking command inputs from the operator. Each of these modules may be adapted to process its raw signals using any of a number of known techniques for event detection related to the raw input signals, such as the detection of erroneous or missing raw signals. Such techniques include voting techniques as further described herein. Each of processed steering sensor signal 444, processed accelerator sensor signal 464 and processed braking sensor signal 484 is provided to each of controllers 412,414,416. Each steering actuator sensor 430, 432,434 is operatively connected to a signal line (not shown) that is in turn operatively connected to a controller 412,414, 416, respectively, and is in signal communication with and adapted to provide its respective raw sensor signal 436,438, 440, respectively, thereto. Similarly, each accelerator actuator sensor 450,452,454 is operatively connected to a signal line (not shown) that is in turn operatively connected to a controller 412,414,416, respectively, and is in signal communication with and adapted to provide its respective raw sensor signal 456,458,460, respectively, thereto. Likewise, each brake actuator sensor 470,472 474 is operatively connected to a signal line (not shown) that is in turn operatively connected to a controller 412,414,416, respectively, and is in signal communication with and adapted to provide its respective raw sensor signal 476,478,480, respectively, thereto. It is preferred that the signal communication of both processed sensor signals and raw sensor signals be provided using hard-wire connections as opposed to a control bus or buses. The use of both raw and processed sensor signals has been utilized previously to provide redundancy with respect to the sensed signal that is utilized by controllers to develop the control command or commands associated with an operator input, as illustrated in FIGS. 1 and 2 in commonly assigned, co-pending U.S. patent application Ser. No. 10/823,469 filed on even date herewith. However, the present invention also provides a third raw sensor signal and a third processed sensor signal for each input device to a third controller. This provides additional bases for comparison of the sensed inputs to the associated raw sensor signals and/or the associated processed sensor signals received by controllers. This enables additional comparisons and tests as between these values and provides enhanced redundancy and fault tolerance of control system 410 as a whole. For example, the third brake sensor signal 480 and the additional value of processed sensor signal 484 to third controller 416 provide additional voting members with respect to the sensed brake input which are then available for the application of voting techniques for ascertaining the correct value to use for the development of brake control commands by each of controllers 412,414,416 in the event that there is a discrepancy between the values of either the raw or processed sensor signals received by any of them, such as might be caused by an event related to one of signal lines carrying any of unprocessed brake actuator sensor signals 476,478, 480 or one or more signal lines carrying processed brake actuator sensor signal 484.

Referring to FIG. 3, each processed sensor signal may be described generally as a signal that is representative of the related raw or unprocessed sensor signals. The processed sensor signal is typically representative of an average, median or other blended representation of the raw sensor signals. The processed sensor signal may be determined by a voting method or process, such as that illustrated in Table 1 and explained below.

TABLE 1

Input Device Module Voting Scheme

| Unprocessed Sensor Voltage $(V_1, V_2, V_3)$ Status | Processed Signal Voltage $(V_m)$ | Disagreeing Sensor | Fault Status Bit Vector $(S_1, S_2, S_3)$ 0 = No Fault 1 = Fault |
|---|---|---|---|
| All sensors within d volts of one another | Median value of all sensors | None | (0, 0, 0) |
| Two sensors within d volts (e.g., less than or equal to), third sensor disagrees by more than d volts | Mean value of sensors that are in agreement | $S_1$ | (1, 0, 0) |
| Two sensors within d volts, third sensor disagrees by more than d volts | Mean value of sensors that are in agreement | $S_2$ | (0, 1, 0) |
| Two sensors within d volts, third sensor disagrees by more than d volts | Mean value of sensors that are in agreement | $S_3$ | (0, 0, 1) |
| No two sensors agree within d volts | Set to Fault Value (e.g., 0) | Any two or all | (1, 1, 1) |

If all sensors are within a sensor calibration value, d, of one another (e.g., d=0.1 volts), they are determined to be in agreement and the value of the processed sensor signal is determined to be the median value of all three signals. A sensor fault status bit vector which is representative of the fault status of all three sensors is determined, wherein a sensor fault condition is represented by a 1 and a sensor no-fault condition is represented by a 0. In the case where all sensors are within the calibration value, the sensor fault status bit vector is determined to be (0,0,0). If any two sensors are determined to be within the calibration value, d, of one another and the third sensor signal varies from either of them by more than the calibration value, the two sensors which are within the calibration value of one another are determined to be in agreement and the value of the processed sensor signal is determined to be the median of the two sensors which are in agreement. In this case, the faulty sensor is identified by comparison of the sensor voltages and the sensor fault status bit vector is determined to be either (0,0,1), (0,1,0) or (1,0,0), depending on which sensor is determined to be faulty. If no two sensors are determined to be within the calibration value, d, of one another, the processed sensor signal is not determined from the value of the unprocessed sensor signals, but is rather determined as a predetermined fault value. The fault value may be zero volts for some types of sensors, but may also be determined to be a non-zero value, depending on the nature of the input device and sensors, as well as the system which is to be controlled based on the processed sensor signal. The voting scheme described above may be used to determine the processed sensor signal for each of the input device modules, including steering actuator sensor module 442, accelerator actuator sensor module 462 and brake actuator sensor module 482.

In accordance with the present invention, the input device module voting scheme may also be extended to controllers 412,414,416 to provide additional redundancy and fault tolerance with respect to the unprocessed and processed sensor signals received by these controllers. Controllers 412,414,416 are adapted to perform control of various vehicle systems, subsystems and components based on the sensed inputs from the input devices using the processed sensor signals associated with those inputs. Once the processed sensor signals, such as processed steering actuator sensor signal, 444, processed accelerator actuator sensor signal 464 and processed brake actuator sensor signal 484 have been received by controllers 412,414,416 it is desirable to test the processed signals for faults, including those which may occur from a faulty module or modules, as well as those which may occur from a fault in the signal lines between the modules and the controllers. As noted above in the background of the invention, this can be done by a comparison of the processed sensor signals via the controller bus and the use of a continuous voting scheme to detect faults in the processed sensor signals and determine a resolved sensor signal. However, such a control architecture cannot provide a resolved processed sensor signal in the event of an event related to the controller bus. The present invention is particularly advantageous in that it utilizes both the processed sensor signals and all three of the associated unprocessed sensor signals to provide an additional degree of fault tolerance with respect to the determination of a resolved processed sensor signal between the controllers. In the present invention, each of the first controller, second controller and third controller is adapted to compare the processed sensor signal and the unprocessed sensor signal associated with a given input device which it has received to determine a first signal differential, second signal differential and a third signal differential, respectively. Upon determining these signal differentials, each of the first controller, second controller and third controller is adapted to compare the respective first signal differential, second signal differential and third signal differential to a predetermined differential threshold (e.g., 0.1 volts) without the need for voting among the controllers. If the absolute value of the first signal differential, second signal differential and third signal differential is less than or equal to the predetermined differential threshold, the processed sensor signal is determined to be "good" or a non-fault, and each of the first controller, second controller and third controller is adapted to use the processed sensor signal as the basis for controlling various vehicle systems, subsystems and components based on the sensed inputs from the input devices without the need for voting among the controllers. If the absolute value of either of the first signal differential, second signal differential and third signal differential is greater than the predetermined differential threshold, the first controller, second controller and third controller are adapted to determine a resolved processed sensor signal for use by each of them to replace the processed sensor signal using the unprocessed sensor signals and the processed sensor signals. The first controller, second controller and third controller may be adapted to determine a resolved sensor signal using the unprocessed sensor signals and the processed sensor signals and a method that comprises voting therebetween, as described below.

Figure 5:
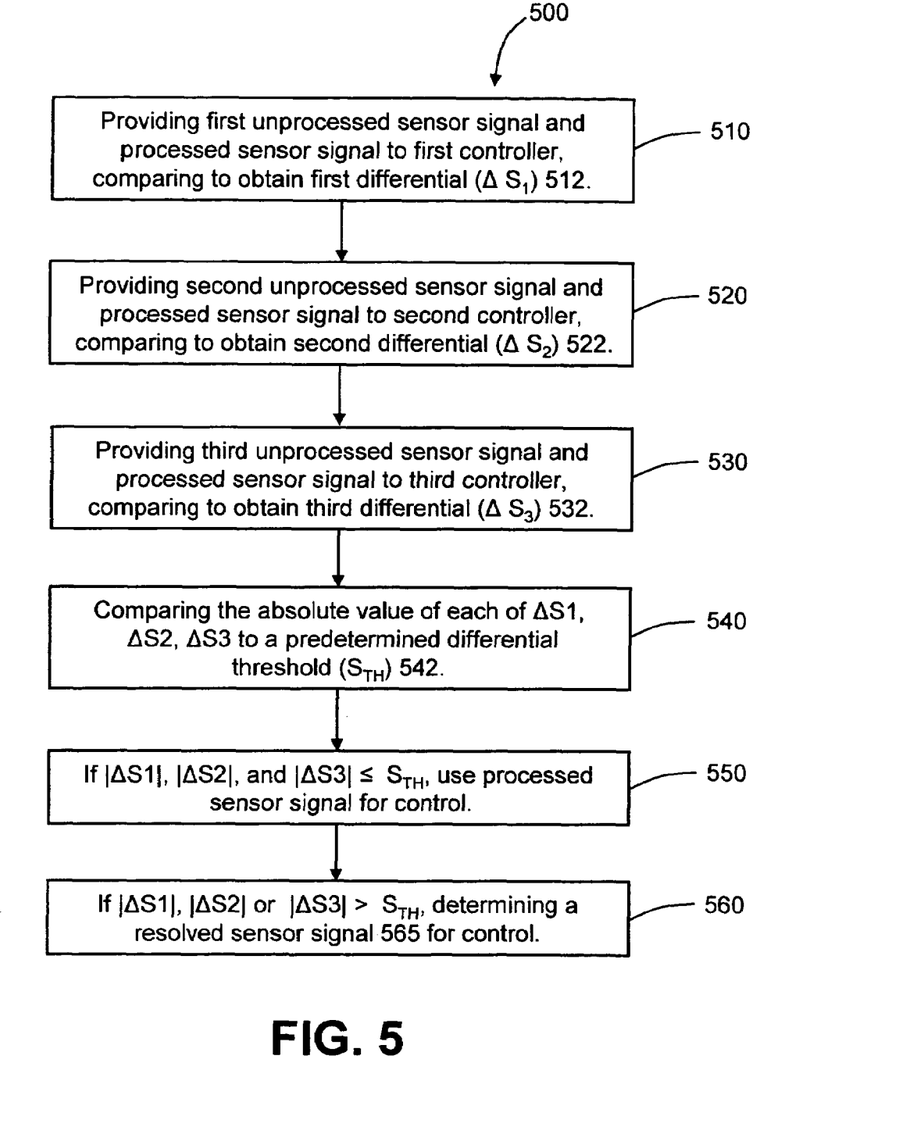
FIG. 5 is a flow chart illustrating a first embodiment of the method of the invention.

Referring to FIG. 5, the present invention comprises a method 500 of determining an input command for a control system, such as control system 410, from a sensed input, and particularly from the processed sensor signal associated with the sensed input. Method 500 may be implemented concurrently with respect to a plurality of processed sensor signals associated with a plurality of sensed inputs. Method 500 comprises a plurality of steps.

Method 500 includes a first step of providing 510 a first unprocessed sensor signal and a processed sensor signal which are associated with a sensed input, for example first unprocessed steering actuator sensor signal 436 and processed steering actuator sensor signal 444, to a first controller and comparing the first unprocessed sensor signal and the processed sensor signal to obtain a first signal differential 512 (e.g., $\Delta S_1$). This may be performed, using conventional signal processing techniques, for example, such as subtracting one signal from the other.

Method 500 also includes a second step of providing 520 a second unprocessed sensor signal and the processed sensor signal which are associated with the sensed input, for example second unprocessed steering actuator sensor signal 438 and processed steering actuator sensor signal 444, to a second controller and comparing the second unprocessed sensor signal and the processed sensor signal to obtain a second signal differential 522 (e.g., $\Delta S_2$).

Method 500 also includes a third step of providing 530 a third unprocessed sensor signal and a processed sensor signal which are associated with the sensed input, for example third unprocessed steering actuator sensor signal 440 and processed steering actuator sensor signal 444, to a third controller and comparing the third unprocessed sensor signal and the processed sensor signal to obtain a third signal differential 532 (e.g., $\Delta S_3$).

Method 500 also includes a fourth step of comparing 540 the absolute value of each of the first signal differential 512, second signal differential 522 and third signal differential 532 to a predetermined differential threshold 542 (e.g., $S_{TH}$).

If the absolute value of each of the first signal differential 512, second signal differential 522 and third signal differential 532 is less than or equal to the predetermined differential threshold 542, method 500 includes a fifth step of using 550 the processed sensor signal in each of the first controller, second controller and third controller, for example processed steering actuator sensor signal 444, for control based on the sensed input.

If the absolute value of one or more of the first signal differential 512, second signal differential 522 and third signal differential 532 is greater than the predetermined differential threshold 542, method 500 includes a sixth step of determining 560 a resolved sensor signal 565 for use in each of the first controller, second controller and third controller in place of the processed sensor signal for control based on the sensed input. Determining 560 a resolved signal in each of the first controller, second controller and third controller for control based on the sensed input may be done in any suitable manner, but preferably comprises voting 570, as described herein, between the first controller, second controller and third controller to determine the resolved sensor signal 565.

Figure 6:
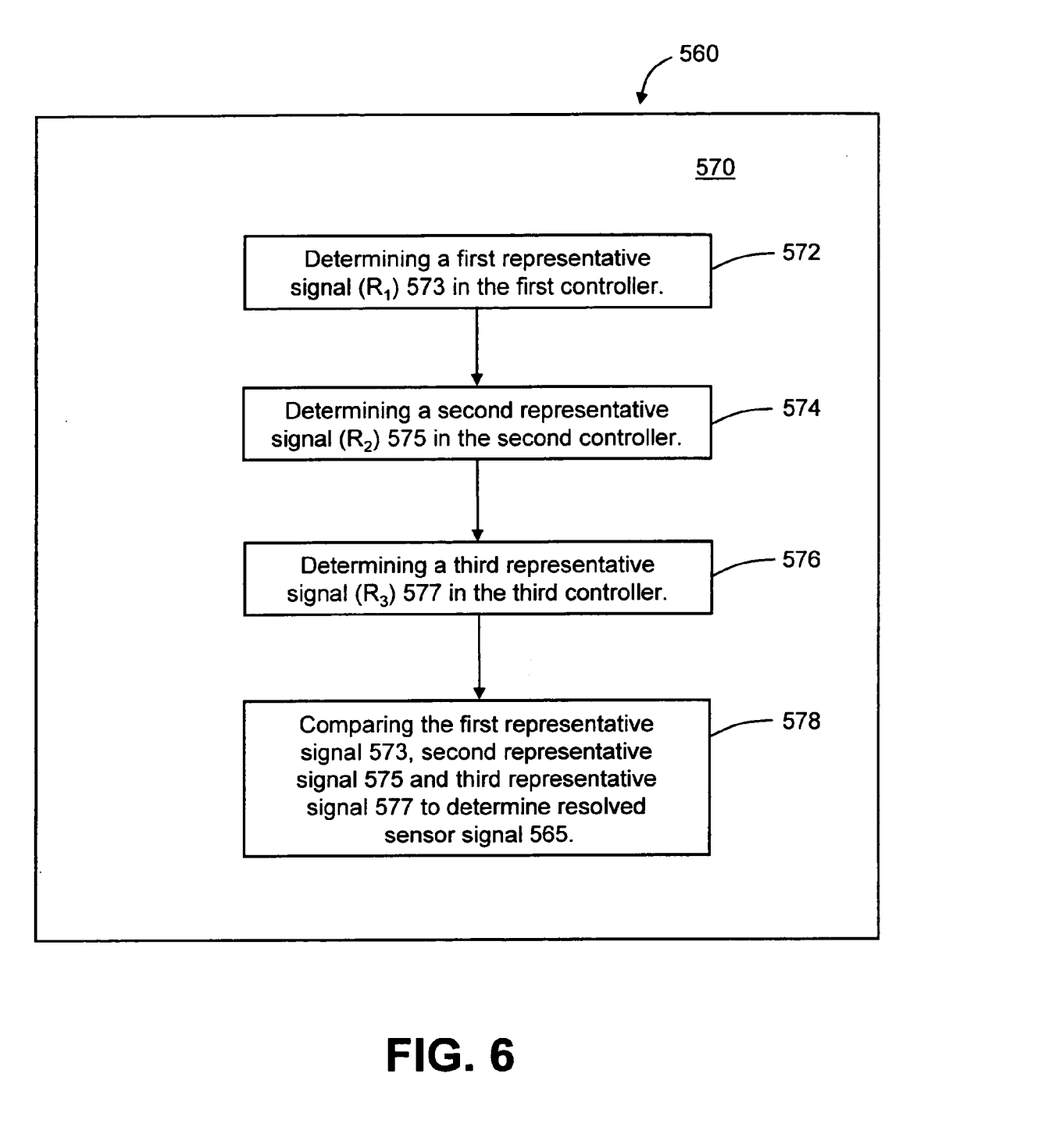
FIG. 6 is a flow chart illustrating an embodiment of a method for performing step 560 of determining a resolved sensor signal of FIG. 5.

Referring to FIG. 6, voting 570 between the first controller, the second controller and the third controller to determine the resolved sensor signal may be performed by any suitable voting method, but preferably comprises voting method set forth in the steps described herein. Voting 570 may be used to determine a resolved sensor signal 565 for any, and preferably all, of the sensor signals received from the various input devices, such as steering actuator, accelerator actuator and brake actuator.

Voting 570 includes a first step of determining 572 a first representative signal 573 ($R_1$) in the first controller using the first unprocessed sensor signal and the processed sensor signal associated with a given input device. The first representative signal 573 may be any suitable signal that is representative of the first unprocessed sensor signal and processed sensor signal and may be determined using any suitable method, but preferably is the average or mean value of these signals. The determination of an average or mean sensor signal from two sensor signal inputs may be made using known signal processing techniques and methods, such as adding the signals and dividing the resultant signal by two.

Voting 570 also includes a second step of determining 574 a second representative signal 575 ($R_2$) in the second controller using the second unprocessed sensor signal and the processed sensor signal associated with a given input device. The second representative signal 575 may also be any suitable signal that is representative of the second unprocessed sensor signal and processed sensor signal and may be determined using any suitable method consistent with determining 572 of first representative signal 573, but is preferably the mean value of these signals as described with respect to first representative signal 573.

Voting 570 also includes a third step of determining 576 a third representative signal 577 ($R_3$) in the third controller using the third unprocessed sensor signal and the processed sensor signal associated with a given input device. The third representative signal 577 may also be any suitable signal that is representative of the third unprocessed sensor signal and processed sensor signal and may be determined using any suitable method consistent with determining 572 of first representative signal 573 and determining 574 of second representative signal 575, but is preferably the mean value of these signals as described with respect to first representative signal 573 and second representative signal 575.

Voting 570 also includes a fourth step of comparing 578 first representative signal 573, second representative signal 575 and third representative signal 577 to determine the resolved sensor signal. Comparing 578 may be any manner of comparing the representative signals in order to determine the resolved sensor signal 565, but it is preferred to use a voting method or process analogous to the voting process described above with regard to Table 1 in conjunction with first representative signal 573, second representative signal 575 and third representative signal 577 to determine resolved sensor signal 565, as described below.

Voting 570 and the step of comparing 578 using a voting process in conjunction with first representative signal 573, second representative signal 575 and third representative signal 577 to determine resolved sensor signal 565 further comprises the following additional steps.

Figure 7:
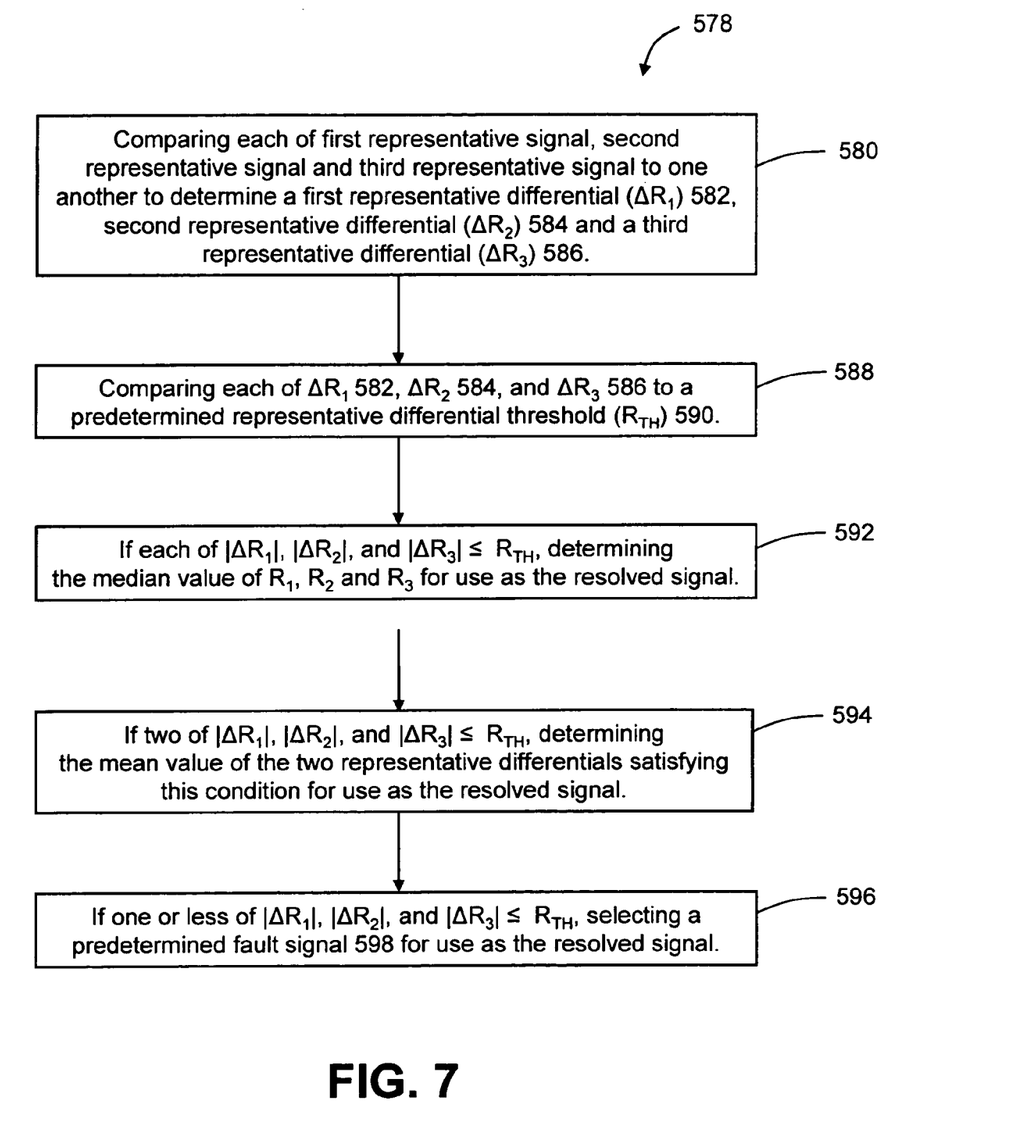
FIG. 7 is a flow chart illustrating an embodiment of a method for performing step 578 of comparing the representative sensor signals to determining a resolved sensor signal of FIG. 6.

Referring to FIG. 7, comparing 578 includes a first step of comparing 580 each of first representative signal 573, second representative signal 575 and third representative signal 577 to one another to determine a first representative differential 582 (e.g., $\Delta R_1 = R_1 - R_2$), second representative differential 584 (e.g., $\Delta R_2 = R_2 - R_3$) and a third representative differential 586 (e.g., $\Delta R_3 = R_3 - R_1$).

Comparing 578 also includes a second step of comparing 588 each of first representative differential 582, second representative differential 584 and third representative differential 586 to a predetermined representative differential threshold 590 (e.g., $R_{TH}$).

If the absolute value of each of first representative differential 582, second representative differential 584 and third representative differential 586 is less than or equal to predetermined representative differential threshold 590, comparing 578 includes a third step of determining 592 a median value of first representative signal 573, second representative signal 575 and third representative signal 577 for use as resolved sensor signal 565.

If the absolute value of two of first representative differential 582, second representative differential 584 and third representative differential 586 are less than or equal to predetermined representative differential threshold 590, determining 594 a mean value of the two representative signals associated with the representative differentials that are less than or equal to predetermined representative differential threshold 590 for use as resolved sensor signal 565. In this way, the representative signal indicating a fault is removed from the determination of the resolved sensor signal.

If the absolute value of one or none of first representative differential 582, second representative differential 584 and third representative differential 586 is less than or equal to predetermined representative differential threshold 590, selecting 596 a predetermined fault value 598 for use as resolved sensor signal 565. If only one or none of the representative signals are determined to be within the predetermined representative differential threshold (e.g. a calibration value, d, where d=0.1 volts as described herein) of one another, the resolved sensor signal is not determined from the value of the representative sensor signals, but is rather determined as predetermined fault value 598. The fault value may be any suitable value, but will generally be a value that is compatible with the control system or component which is to be controlled based on the resolved sensor signal. This may be zero volts for some types of control system or component, but may also be determined to be a non-zero value, depending on the nature of the input device and sensors, as well as the control system or component which is to be controlled based on resolved sensor signal 565. The voting process described above may be used to determine a resolved sensor signal 565 for each of the input devices and the unprocessed and processed sensor signals associated therewith, including unprocessed steering actuator sensor signals 436,438,440 and processed steering actuator sensor signal 444, unprocessed accelerator actuator sensor signals 456,458,460 and processed steering actuator sensor signal 464, and unprocessed brake actuator sensor signals 476,478,480 and processed steering actuator sensor signal 484. Employment of method 500 and voting process 570 is particularly advantageous because it is only employed if a discrepancy is observed between the unprocessed and processed sensor signals, and thus does not require the continuous voting and use of computing resources of prior methods. Thus, it is believed that the method and the associated control system has enhanced fault tolerance with regard to events related to the controller bus, as the method is completely tolerant of a single point event related to the controller bus, so long as no discrepancy is observed with respect to the unprocessed and processed sensor signals. This advantage would permit the incorporation of additional features, such as, for example, providing a warning indication to an operator in case of an event related to the controller bus while continuing to provide normal control of the various input devices according to the method described above. This is in contrast to systems which utilize continuous voting which would immediately resort to a fault value in case of an event related to the controller bus.

Referring to FIG. 4, as described above, control system 410 may also be adapted so that control system 410 is also adapted to provide fault status signals associated with the unprocessed sensor signals of each of the input devices, such as steering actuator sensor status signal 446, accelerator actuator sensor status signal 466 and brake actuator sensor status signal 486. Each of these fault status signals generally comprises a signal that is indicative of a sensor fault bit status of the associated input device module. As described herein, the fault status bit vector status provides a summary indication of the fault/no-fault status of each of the sensors associated with the input device. It is believed that these fault status signals may be utilized to provide an additional degree of fault tolerance and/or redundancy to the sensor signals associated with the various input devices, in the manner described herein.

Figure 8:
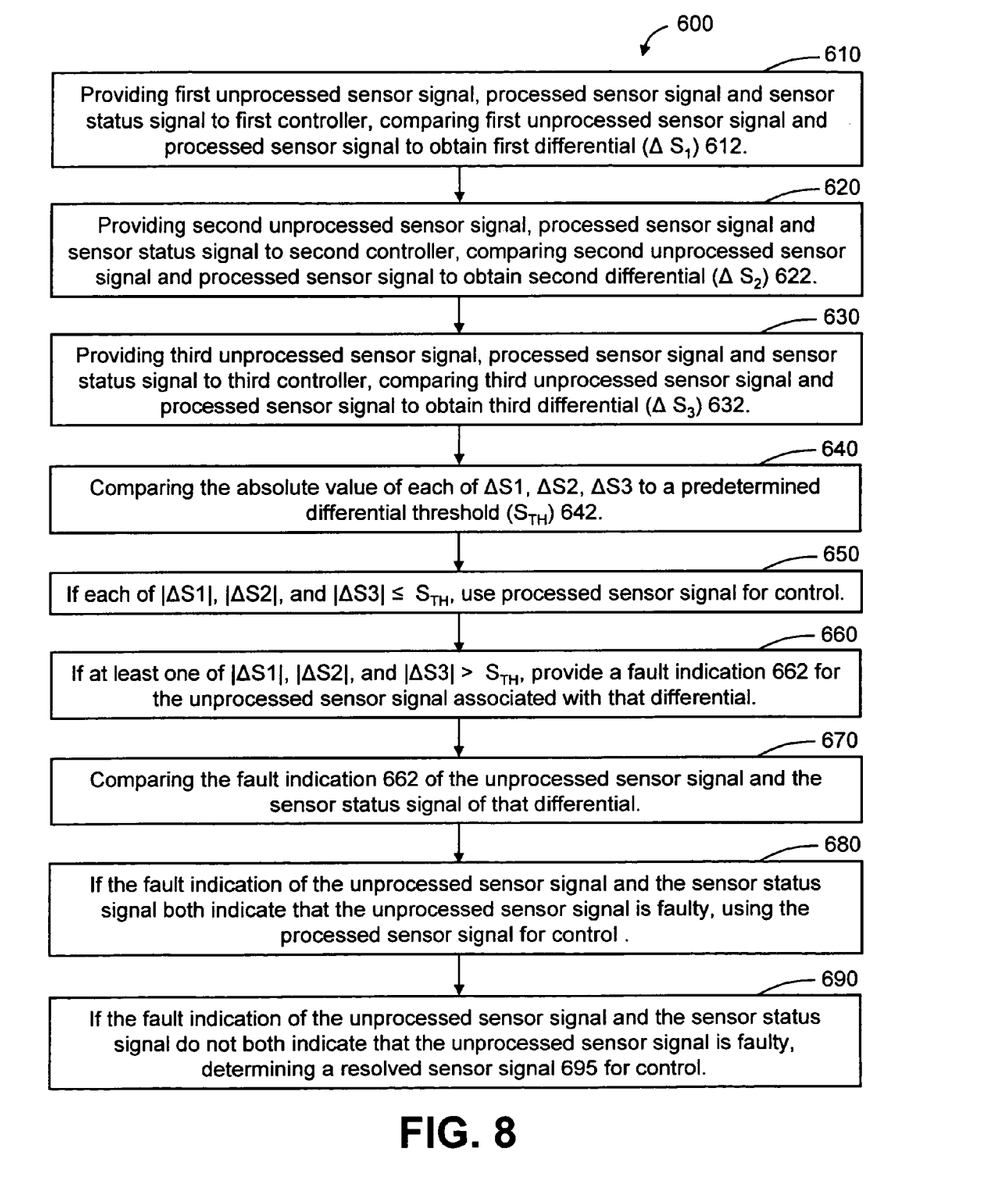
FIG. 8 is a flow chart illustrating a second embodiment of the method of the invention.

Referring to FIGS. 4 and 8, the present invention comprises a method 600 of determining an input command for a control system, such as control system 410 (see FIG. 4), from a sensed input, and particularly from the processed sensor signal associated with the sensed input. Method 600 may be implemented concurrently with respect to a plurality of processed sensor signals associated with a plurality of sensed inputs. Method 600 comprises a plurality of steps as further described herein.

Method 600 includes a first step of providing 610 a first unprocessed sensor signal, a processed sensor signal and a sensor status signal, for example first unprocessed steering actuator sensor signal 436, processed steering actuator sensor signal 444 and steering actuator sensor status signal 446, which are associated with a sensed input to a first controller, for example first controller 412, and comparing the first unprocessed sensor signal and the processed sensor signal to obtain a first signal differential 612 (e.g., $\Delta S_1$). The sensor status signal is adapted to provide a fault or-no-fault status indication for each of the first unprocessed sensor signal, second unprocessed sensor signal and the third unprocessed sensor signal, for example, first unprocessed steering actuator sensor signal 436, second unprocessed steering actuator sensor signal 438 and third unprocessed steering actuator sensor signal 440.

Method 600 also includes a second step of providing 620 a second unprocessed sensor signal, the processed sensor signal and the sensor status signal, for example second unprocessed steering actuator sensor signal 438, processed steering actuator sensor signal 444 and steering actuator sensor status signal 446, which are associated with the sensed input to a second controller, for example, second controller 414, and comparing the second unprocessed sensor signal and the processed sensor signal to obtain a second signal differential 622 (e.g., $\Delta S_2$).

Method 600 also includes a third step of providing 630 a third unprocessed sensor signal, the processed sensor signal and the sensor status signal which are associated with the sensed input to a third controller, for example, third controller 416, and comparing the third unprocessed sensor signal and the processed sensor signal to obtain a third signal differential 632 (e.g., $\Delta S_3$).

Method 600 also includes a fourth step of comparing 640 the absolute value of each of the first signal differential 612, second signal differential 622 and third signal differential 632 to a predetermined differential threshold 642 (e.g., $S_{TH}$).

If the absolute value of each of the first signal differential 612, second signal differential 622 and third signal differential 632 is less than or equal to predetermined differential threshold 642, method 600 includes a fifth step of using 650 the processed sensor signal in each of the first controller, second controller and third controller for control based on the sensed input, for example, processed steering actuator sensor signal 444.

If the absolute value of one or more of the first signal differential 612, second signal differential 622 and third signal differential 632 is greater than the predetermined differential threshold 642, method 600 includes a sixth step of determining 660 which of the first signal differential 612, second signal differential 622 and third signal differential 632 is greater than the predetermined differential threshold 642 and providing a fault indication 662 for the unprocessed sensor signal associated with that signal differential. Determining 660 may be performed using any of a number of known techniques, for example, if the first differential 612 exceeds predetermined differential threshold 642, first controller 412 can associate a fault with the first unprocessed sensor signal that is associated with the differential, for example first unprocessed steering actuator sensor signal 436. The fault indication 662 may comprise any suitable fault indication, such as a fault status bit vector 664 analogous to that utilized in conjunction with input device modules as described herein.

Method 600 includes a seventh step of comparing 670 the fault indication 662 of the unprocessed sensor signal with the status indication of the sensor status signal of that unprocessed sensor signal. This comparison is performed to determine whether fault indication 662 and the information about the status of that unprocessed sensor signal contained in the related sensor status signal agree as to the status of the unprocessed sensor signal. Again, this comparison may be done in any manner that is compatible with method 600, such as the comparison of the value of a fault status bit vector determined by the controller with the related fault status bit vector received by the controller from the related actuator module. For example, in a case where fault indication 662 is a fault status bit vector which indicates that first unprocessed steering actuator sensor signal 436 is faulty (e.g., (1,0,0)) and the associated sensor status signal 446 received from steering actuator sensor module 442 also indicates through fault status bit vector 445 that first unprocessed steering actuator sensor signal 436 is faulty (e.g., (1,0,0)), these fault indications may be said to agree. If otherwise, they may be said to disagree.

If the fault indication 662 of the unprocessed sensor signal and the status indication of the sensor status signal of that unprocessed sensor signal both indicate a fault, method 600 includes an eighth step of using 680 the associated processed sensor signal in each of the first controller, second controller and third controller for control based on the sensed input. This is advantageous because even though an unprocessed sensor signal may be determined to be faulty, the other unprocessed sensor signals may be used to determine whether the processed sensor signal is "good", and whether it may still be used to provide control without the need to resort to voting between the controllers to determine a resolved sensor signal.

If the fault indication 662 of the unprocessed sensor signal with the status indication of the sensor status signal of that unprocessed sensor signal do not both indicate a fault, method 600 includes a ninth step of determining 690 a resolved sensor signal 695 for use in each of the first controller, second controller and third controller for control based on the sensed input. Determining 690 a resolved signal in each of the first controller, second controller and third controller for control based on the sensed input may be done in any suitable manner, but preferably comprises voting, such as is described herein, between the first controller, second controller and third controller to determine the resolved sensor signal 695.

Voting between the first controller, the second controller and the third controller to determine the resolved sensor signal may be performed using any suitable voting method, but preferably comprises the same steps as are described herein with regard to voting 570. Voting may be used to determine a resolved sensor signal 695 for any, and preferably all, of the sensor signals received from the various input devices, such as steering actuator, accelerator actuator and brake actuator.

Further scope of applicability of the present invention will become apparent from the drawings and this detailed description, as well as the following claims. However, it should be understood that the detailed description and specific examples, while indicating preferred embodiments of the invention, are given by way of illustration only, since various changes and modifications within the spirit and scope of the invention will become apparent to those skilled in the art.

The invention claimed is:

1. A control system for a vehicle, comprising:
   at least one input device which is operatively connected to a first sensor, a second sensor and a third sensor for sensing an input to said input device and providing in response thereto a first unprocessed sensor signal, a second unprocessed sensor signal and a third unprocessed sensor signal;
   an input device module to receive the first unprocessed sensor signal, the second unprocessed sensor signal and the third unprocessed sensor signal and provide a processed sensor signal output;
   a first controller to receive the first unprocessed sensor signal and the processed sensor signal;
   a second controller to receive the second unprocessed sensor signal and the processed sensor signal;
   a third controller to receive the third unprocessed sensor signal and the processed sensor signal, and
   a controller bus which is operatively connected to each of said first controller, said second controller and said third controller to provide signal communication between each of them.

2. The control system of claim 1, wherein each of said first controller, second controller and third controller compares the processed sensor signal and the unprocessed sensor signal which it has received to determine a first signal differential, a second signal differential and a third signal differential, respectively.

3. The control system of claim 2, wherein each of said first controller, second controller and third controller compares the respective first signal differential, second signal differential and third signal differential to a predetermined differential threshold, and wherein if the absolute value of either of the first signal differential, second signal differential and third signal differential is greater than the predetermined differential threshold, said first controller, second controller and third controller determine a resolved sensor signal for use by each of them using the unprocessed sensor signals and the processed sensor signals, and wherein if the absolute value of the first signal differential, second signal differential and third signal differential is less than or equal to the predetermined differential threshold, each of said first controller, second controller and third controller uses the processed sensor signal.

4. The control system of claim 3, wherein said first controller, second controller and third controller determine a resolved sensor signal using a voting process therebetween.

5. The control system of claim 3, wherein said input device is an accelerator actuator and the first sensor, second sensor and third sensor are each an accelerator actuator sensor.

6. The control system of claim 3, wherein said input device is a brake actuator and the first sensor, second sensor and third sensor are each a brake actuator sensor.

7. The control system of claim 3, wherein said input device is a steering actuator and the first sensor, second sensor and third sensor are each a steering actuator sensor.

8. The control system of claim 1, wherein said input device module also provides a sensor status signal output, and wherein each of said first controller, second controller and third controller receives the sensor status signal.

9. The control system of claim 8, wherein each of said first controller, second controller and third controller compares the processed sensor signal and the unprocessed sensor signal which it has received to determine a first signal differential, a second signal differential and a third signal differential, respectively.

10. The control system of claim 9, wherein each of said first controller, second controller and third controller compares the respective first signal differential, second signal differential and third signal differential to a predetermined differential threshold, and wherein if the absolute value of either of the first signal differential, second signal differential and third signal differential is greater than the predetermined differential threshold, said first controller, second controller and third controller determine a resolved sensor signal value for use by each of them using the unprocessed sensor signals, the processed sensor signal and the sensor status signal, and wherein if the absolute value of the first signal differential, the second signal, differential and the third signal differential is less than or equal to the predetermined differential threshold, each of said first controller, said second controller and said third controller uses the processed sensor signal.

11. A control system for a vehicle, comprising:
a plurality of input devices, each said input device operatively connected to a first sensor, a second sensor and a third sensor for sensing an input to said input device and providing in response thereto a first unprocessed sensor signal, a second unprocessed sensor signal and a third unprocessed sensor signal;
a plurality of input device modules, each said input device module corresponding to one of the plurality of input devices and receives its first unprocessed sensor signal, second unprocessed sensor signal and third unprocessed sensor signal and provide a corresponding processed sensor signal output;
a first controller which receives the first unprocessed sensor signal and the processed sensor signal of each of said input devices;
a second controller which receives the second unprocessed sensor signal and the processed sensor signal of each of said input devices;
a third controller which receives the third unprocessed sensor signal and the processed sensor signal of each of said input devices; and
a controller bus which is operatively connected to each of said first controller, said second controller and said third controller and provides signal communication between each of them.

12. The control system of claim 11, wherein each of said first controller, said second controller and said third controller compares the processed sensor signal and the unprocessed sensor signal which it has received from each input device to determine a first signal differential, a second signal differential and a third signal differential, respectively, for each said input device.

13. The control system of claim 12, wherein each of said first controller, second controller and third controller compares the respective first signal differential, second signal differential and third signal differential of each input device to a predetermined differential threshold of that input device, and wherein if the absolute value of the first signal differential, second signal differential and third signal differential of an input device is greater than the predetermined differential threshold of that input device, said first controller, second controller and third controller determine a resolved sensor signal value for that input device for use by each of them using the unprocessed sensor signals and the processed sensor signals, and wherein if the absolute value of the first signal differential, second signal differential and third signal differential of an input device is less than or equal to the predetermined differential threshold of that device, each of said first controller, second controller and third controller uses the processed sensor signal of that input device.

14. The control system of claim 13, wherein said plurality of input devices is selected from a group consisting of an accelerator actuator, a brake actuator, a steering actuator, a yaw rate sensor module and a lateral acceleration sensor module.

15. The control system of claim 13, wherein said first controller, second controller and third controller determine a resolved sensor signal using a voting process therebetween.

16. The control system of claim 11, wherein each of said input device modules also provides respective sensor status signal output, and wherein each of said first controller, second controller and third controller receive the respective sensor status signals.

17. The control system of claim 16, wherein each of said first controller, second controller and third controller compares the processed sensor signal and the unprocessed sensor signal which it has received from each input device to determine a first signal differential, a second signal differential and a third signal differential, respectively, for each input device.

18. The control system of claim 17, wherein each of said first controller, said second controller and said third controller compares the respective first signal differential, second signal differential and third signal differential of each input device to a predetermined differential threshold of that input device, and wherein if the absolute value of the first signal differential, the second signal differential and the third signal differential of an input device is greater than the predetermined differential threshold of that input device, said first controller, second controller and third controller determine a resolved sensor signal value for that input device for use by each of them using the unprocessed sensor signals, the processed sensor signals and the sensor status signals, and wherein if the absolute value of either of the first signal differential, second signal differential and third signal differential of an input device is less than or equal to the predetermined differential threshold of that device, each of said first controller, second controller and third controller uses the processed sensor signal of that input device.

19. A method of determining an input command for a control system from a sensed input, the method comprising:

providing a first unprocessed sensor signal and a processed sensor signal which are associated with a sensed input to a first controller and comparing the first unprocessed sensor signal and the processed sensor signal to obtain a first signal differential;

providing a second unprocessed sensor signal and the processed sensor signal which are associated with the sensed input to a second controller and comparing the second unprocessed sensor signal and the processed sensor signal to obtain a second signal differential;

providing a third unprocessed sensor signal and a processed sensor signal which are associated with the sensed input to a third controller and comparing the third unprocessed sensor signal and the processed sensor signal to obtain a third signal differential;

comparing the absolute value of each of the first signal differential, second signal differential and third signal differential to a predetermined differential threshold, if the absolute value of each of the first signal differential, second signal differential and third signal differential is less than or equal to the predetermined differential threshold, using the processed sensor signal in each of the first controller, second controller and third controller for control based on the sensed input;

if the absolute value of one of the first signal differential, second signal differential and third signal differential is greater than the predetermined differential threshold, determining a resolved sensor signal for use in each of the first controller, second controller and third controller for control based on the sensed input.

20. The method of claim 19, wherein determining a resolved signal in each of the first controller, second controller and third controller for control based on the sensed input comprises voting between the first controller, second controller and third controller to determine the resolved sensor signal.

21. The method of claim 20, wherein voting between the first controller, the second controller and the third controller to determine the resolved sensor signal comprises:

determining a first representative signal in the first controller using the first unprocessed sensor signal and the processed sensor signal;

determining a second representative signal in the second controller using the second unprocessed sensor signal and the processed sensor signal;

determining a third representative signal in the third controller using the third unprocessed sensor signal and the processed sensor signal; and comparing the first representative signal, the second representative signal and the third representative signal to determine the resolved sensor signal.

22. The method of claim 21, wherein comparing the first representative signal, second representative signal and third representative signal to determine the resolved sensor signal comprises:

comparing each of the first representative signal, the second representative signal and third representative signal to one another to determine a first representative differential, a second representative differential and a third representative differential;

comparing each of the first representative differential, second representative differential and third representative differential to a predetermined representative differential threshold, if the absolute value of each of the first representative differential, second representative differential and third representative differential is less than or equal to the predetermined representative differential threshold, determining a median value of the first representative signal, the second representative signal and third representative signal for use as the resolved sensor signal;

if the absolute value of one of the first representative differential, second representative differential and third representative differential is less than or equal to the predetermined representative differential threshold, determining a mean value of the two representative signals associated with the representative differentials that are less than or equal to the predetermined representative differential threshold; and if the absolute value of two or more of the first representative differential, second representative differential and third representative differential is greater than the predetermined representative differential threshold, selecting a predetermined fault value for use as the resolved sensor signal.

23. A method of determining an input command for a control system from a sensed input, the method comprising:

providing a first unprocessed sensor signal, a processed sensor signal and a sensor status signal which are associated with a sensed input to a first controller and comparing the first unprocessed sensor signal and the processed sensor signal to obtain a first signal differential, wherein the sensor status signal provides a fault or-no-fault status indication for each of the first unprocessed sensor signal, second unprocessed sensor signal and the third unprocessed sensor signal;

providing a second unprocessed sensor signal, the processed sensor signal and the sensor status signal which are associated with the sensed input to a second controller and comparing the second unprocessed sensor signal and the processed sensor signal to obtain a second signal differential;

providing a third unprocessed sensor signal, the processed sensor signal and the sensor status signal which are associated with the sensed input to a third controller and comparing the third unprocessed sensor signal and the processed sensor signal to obtain a third signal differential;

comparing the absolute value of each of the first signal differential, second signal differential and third signal differential to a predetermined differential threshold, if the absolute value of each of the first signal differential, second signal differential and third signal differential is less than or equal to the predetermined differential threshold, using the processed sensor signal in each of the first controller, second controller and third controller for control based on the sensed input;

if the absolute value of at least one of the first signal differential, second signal differential and third signal differential is greater than the predetermined differential threshold, determining which of the first signal differential, second signal differential and third signal differential is greater than the predetermined differential threshold and providing a fault indication for the unprocessed sensor signal associated with that signal differential;

comparing the fault indication of the unprocessed sensor signal with the stats indication of the sensor status signal of that unprocessed sensor signal;

if the fault indication of the unprocessed sensor signal and the status indication of the sensor status signal of that unprocessed sensor signal both indicate a fault, using the processed sensor signal in each of the first controller, second controller and third controller for control based on the sensed input if the fault indication of the unprocessed sensor signal with the status indication of the sensor status signal of that unprocessed sensor signal do not both indicate a fault determining a resolved sensor signal for use in each of the first controller, second controller and third controller for control based on the sensed input.

24. The method of claim 23, wherein determining a resolved signal in each of the first controller, second controller and third controller for control based on the sensed input comprises voting between the first controller, the second controller and the third controller to determine the resolved sensor signal.

25. The method of claim 24, wherein voting between the first controller, second controller and third controller to determine the resolved sensor signal comprises:

determining a first representative signal in the first controller using the first unprocessed sensor signal and the processed sensor signal;

determining a second representative signal in the second controller using the second unprocessed sensor signal and the processed sensor signal;

determining a third representative signal in the third controller using the third unprocessed sensor signal and the processed sensor signal; and comparing the first representative signal, second representative signal and third representative signal to determine the resolved sensor signal.

26. The method of claim 25, wherein comparing the first representative signal, the second representative signal and the third representative signal to determine the resolved sensor signal comprises:

comparing each of the first representative signal, the second representative signal and third representative signal to one another to determine a first representative differential, a second representative differential and a third representative differential;

comparing each of the first representative differential, second representative differential and third representative differential to a predetermined representative differential threshold, if the absolute value of each of the first representative differential, second representative differential and third representative differential is less than or equal to the predetermined representative differential threshold, determining a median value of the first representative signal, second representative signal and third representative signal for use as the resolved sensor signal;

if the absolute value of one of the first representative differential, second representative differential and third representative differential is less than or equal to the predetermined representative threshold, determining a mean value of the two representative signals associated with the representative differentials that are less than or equal to the predetermined representative threshold; and if the absolute value of each of the first representative differential, second representative differential and third representative differential is greater than the predetermined representative differential threshold, selecting a predetermined fault value for use as the resolved sensor signal.

* * * * *